(12) United States Patent
Ito

(10) Patent No.: US 7,669,982 B2
(45) Date of Patent: Mar. 2, 2010

(54) LAMINATED AND BONDED STRUCTURE OF PLATES

(75) Inventor: Atsushi Ito, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 904 days.

(21) Appl. No.: 11/122,296

(22) Filed: May 4, 2005

(65) Prior Publication Data

US 2006/0024477 A1    Feb. 2, 2006

(30) Foreign Application Priority Data

May 7, 2004    (JP)    ............................ P2004-138453

(51) Int. Cl.
*B41J 2/045*    (2006.01)
*B41J 2/05*    (2006.01)

(52) U.S. Cl. .............................. 347/68; 347/71; 347/72

(58) Field of Classification Search ................... 347/68, 347/71, 72; 346/65
See application file for complete search history.

(56) References Cited

U.S. PATENT DOCUMENTS

| | | | |
|---|---|---|---|
| 5,402,159 A | 3/1995 | Takahashi et al. | |
| 6,361,152 B1 * | 3/2002 | Fujisawa | 347/68 |
| 6,536,879 B2 | 3/2003 | Ito et al. | |
| 6,955,420 B2 | 10/2005 | Ito | |
| 7,311,272 B2 | 12/2007 | Ito | |
| 2004/0189752 A1 * | 9/2004 | Satake | 347/68 |
| 2008/0084460 A1 | 4/2008 | Ito | |

FOREIGN PATENT DOCUMENTS

| | | | |
|---|---|---|---|
| JP | 4-341853 | | 11/1992 |
| JP | 08258258 A | * | 10/1996 |
| JP | 2002-96478 | | 4/2002 |
| JP | 2004-50818 | | 2/2004 |

* cited by examiner

*Primary Examiner*—Stephen D Meier
*Assistant Examiner*—Sarah Al-Hashimi
(74) *Attorney, Agent, or Firm*—Reed Smith LLP

(57) ABSTRACT

A laminated and bonded structure includes plural plates. The plates include first and second plates. The plates are laminated and bonded to each other with an adhesive agent. The first and second plates have laminated surfaces bonded to each other. A first escape groove is defined in the laminated surface of at least one of the first and second plates. The first escape groove guides the adhesive agent along the laminated surface. The first escape groove includes an outlet portion in an outer peripheral side surface of the at least one of the first and second plates. The outer peripheral side surface intersects with the laminated surfaces. One of the first and second plates defines a recessed first reservoir portion being capable of accumulating the adhesive agent passing through the first escape groove. The first reservoir portion communicates with the first escape groove.

19 Claims, 11 Drawing Sheets

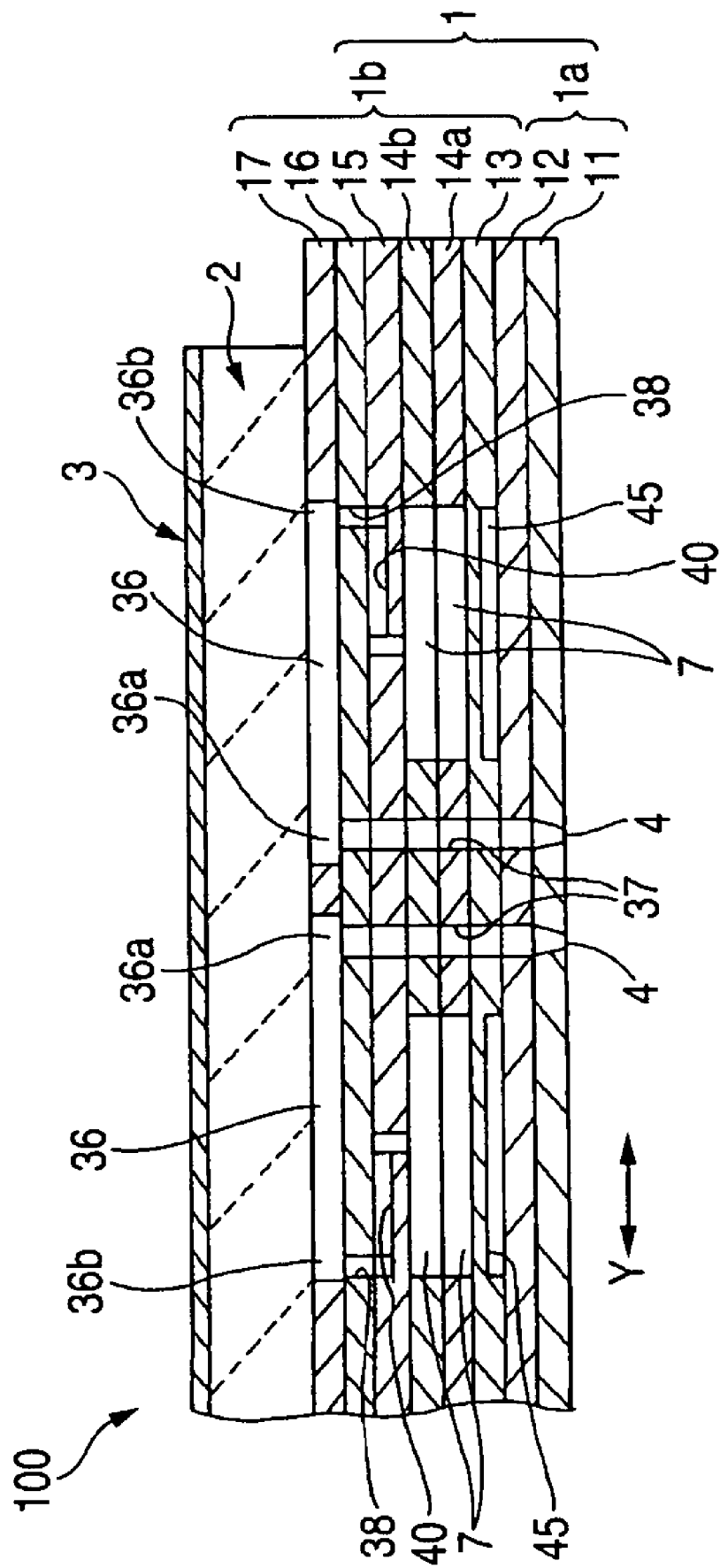

LAMINATED AND BONDED STRUCTURE OF PLATES

BACKGROUND OF THE INVENTION

1. Field of the Invention

The present invention relates to a laminated and bonded structure of sheet-shaped elements such as plates used in a laminated inkjet head.

2. Description of the Related Art

U.S. Pat. No. 6,536,879 (FIGS. 4, 10, and 11) discloses a piezoelectric inkjet head. Specifically, U.S. Pat. No. 6,536,879 discloses a recording head in which a cavity unit is formed by laminating a nozzle plate, a cavity plate, and a manifold plate with an adhesive agent. A plurality of nozzles are defined at constant intervals on the nozzle plate. A pressure chamber corresponding to each nozzle is defined in the cavity plate. The manifold plate is disposed between the cavity plate and the nozzle plate, and defines a common ink chamber for supplying ink to each pressure chamber. Ink from an ink storage section (ink tank) is introduced through an ink supply port defined on a rear surface side of the cavity unit to each common ink chamber. A piezoelectric actuator is joined to the rear face of the cavity unit. When the piezoelectric actuator is driven, ink is ejected from a selected nozzle to record an image on a recording medium.

The cavity unit disclosed in U.S. Pat. No. 6,536,879 is constructed as follows. An escape groove for adhesive is defined in a recessed manner in one laminated surface of each plate. Air escape holes are defined to pass through each of the plates in a thickness direction, at the same locations above and below the escape grooves. When the adhesive agent is applied to the plates and the plates are laminated on each other, the air contained in the laminated surfaces or the adhesive is discharged through the air holes out of the uppermost plate together with an excessive adhesive.

SUMMARY OF THE INVENTION

However, in the inkjet head disclosed in U.S. Pat. No. 6,536,879, if the excessive adhesive is too much, the excessive adhesive is not only discharged through the escape grooves and the air holes but also is stuck out along the surfaces of the plates, onto an outer peripheral side surface perpendicular to the laminated surfaces. The stuck-out adhesive flows down on the outer peripheral side surfaces, thereby contaminating a bonding device during bonding work. As a result, there has arisen a problem in that the bonding device needs to be cleaned frequently, thereby decreasing productivity (production efficiency).

The above-mentioned problem also is raised in manufacturing other laminated sheet-shaped elements.

Accordingly, the present invention has been made to solve the above-mentioned problems.

According to one embodiment of the invention, a laminated and bonded structure includes a plurality of plates. The plurality of plates include a first plate and a second plate. The plates are laminated and bonded to each other with an adhesive agent. The first and second plates have laminated surfaces bonded to each other. A first escape groove is defined in the laminated surface of at least one of the first and second plates. The first escape groove guides the adhesive agent along the laminated surface of the at least one of the first and second plates. The first escape groove includes an outlet portion in an outer peripheral side surface of the at least one of the first and second plates. The outer peripheral side surface intersects with the laminated surfaces. One of the first and second plates defines a recessed first reservoir portion being capable of accumulating the adhesive agent passing through the first escape groove. The first reservoir portion communicates with the first escape groove.

According to this structure, the excessive adhesive agent left on the laminated surfaces of the plates is guided to the outlet portion by the escape groove. Since the first reservoir portion communicates with the escape groove, the excessive adhesive agent flows into and accumulates in the first reservoir portion. As a result, it is possible to prevent contamination of a bonding device by the excessive adhesive agent stuck out onto the outer peripheral side surface, thereby increasing production efficiency.

According to one embodiment of the invention, a laminated and bonded structure includes a plurality of plates. The plurality of plates include a first plate and a second plate. The plates are laminated and bonded to each other with an adhesive agent. The first and second plates having laminated surfaces bonded to each other. The first plate defines a first escape groove in another surface. The first escape groove guides the adhesive agent along the other surface of the first plate. The first escape groove includes an outlet portion in an outer peripheral side surface of the first plate. The outer peripheral side surface intersects with the other surface of the first plate. The first plate defines a recessed first reservoir portion being capable of accumulating the adhesive agent passing through the first escape groove. The first reservoir portion communicates with the first escape groove. The first plate further defines a through hole passing through the first plate in a thickness direction. The second plate defines a second escape groove in the laminated surface. The second escape groove guiding the adhesive agent along the laminated surface of the second plate. Both ends of the through hole communicate with the first escape groove and the second escape groove, respectively.

BRIEF DESCRIPTION OF THE DRAWINGS

FIG. 4 is an enlarged cross-sectional view taken along the line IV-IV of FIG. 1.

DETAILED DESCRIPTION OF THE PREFERRED EMBODIMENTS

Hereinafter, embodiments of the invention will be described with reference to the accompanying drawings.

Figure 1:
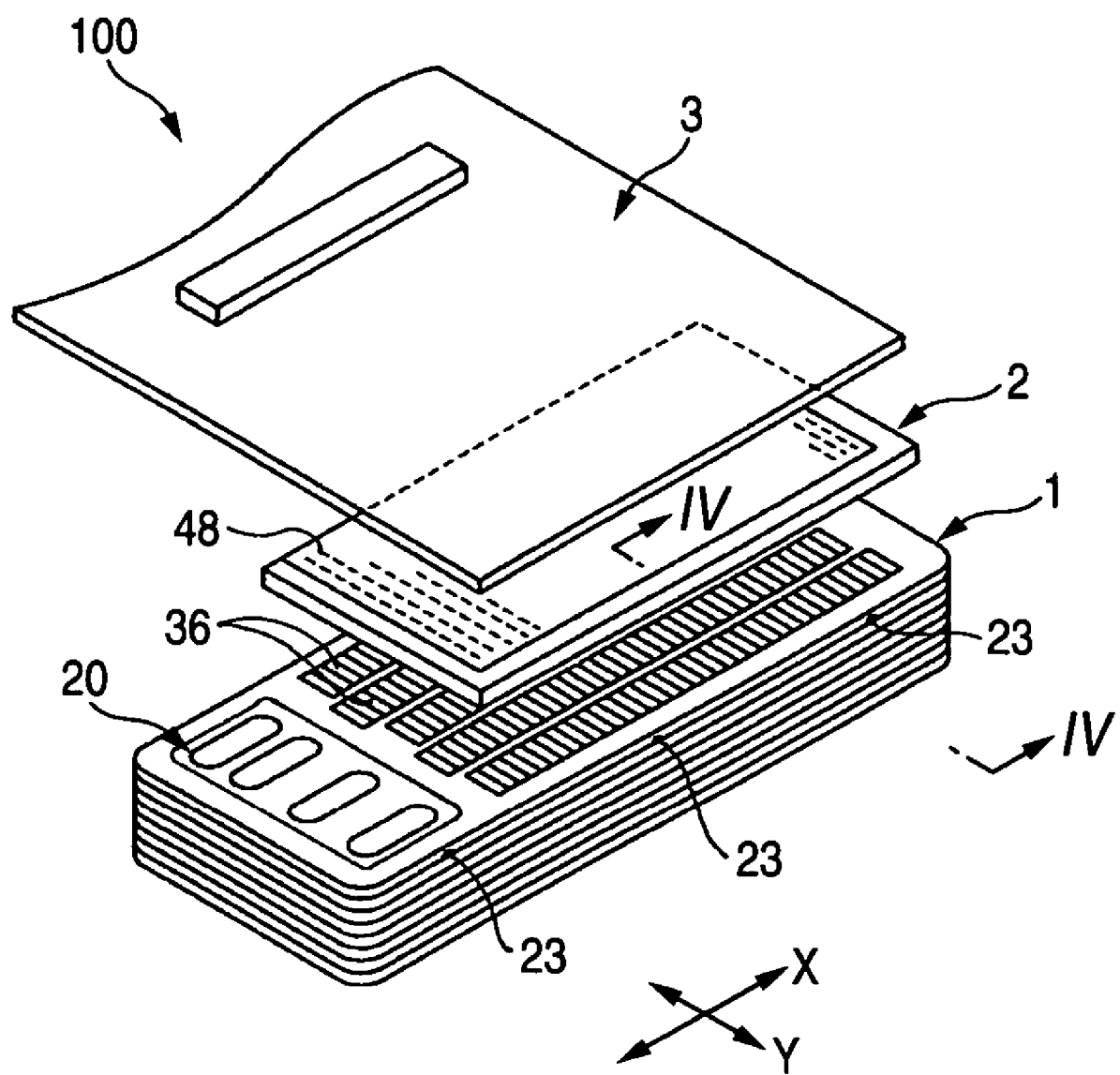
FIG. 1 is a perspective view illustrating an inkjet head according to a first embodiment of the invention.

FIG. 1 is a perspective view illustrating a cavity unit 1 and a piezoelectric actuator unit 2 in a piezoelectric inkjet head 100 according to a first embodiment of the invention. The plate-type piezoelectric actuator unit 2 is bonded to the cavity unit 1 including a plurality of metallic plates. A flexible flat cable 3 for connecting with an external device is laminated on an upper surface of the plate-type piezoelectric actuator unit 2 (see FIG. 4). Ink is ejected downwardly from the nozzles 4 defined in a lower surface of the lowermost plate thereof.

Figure 2:
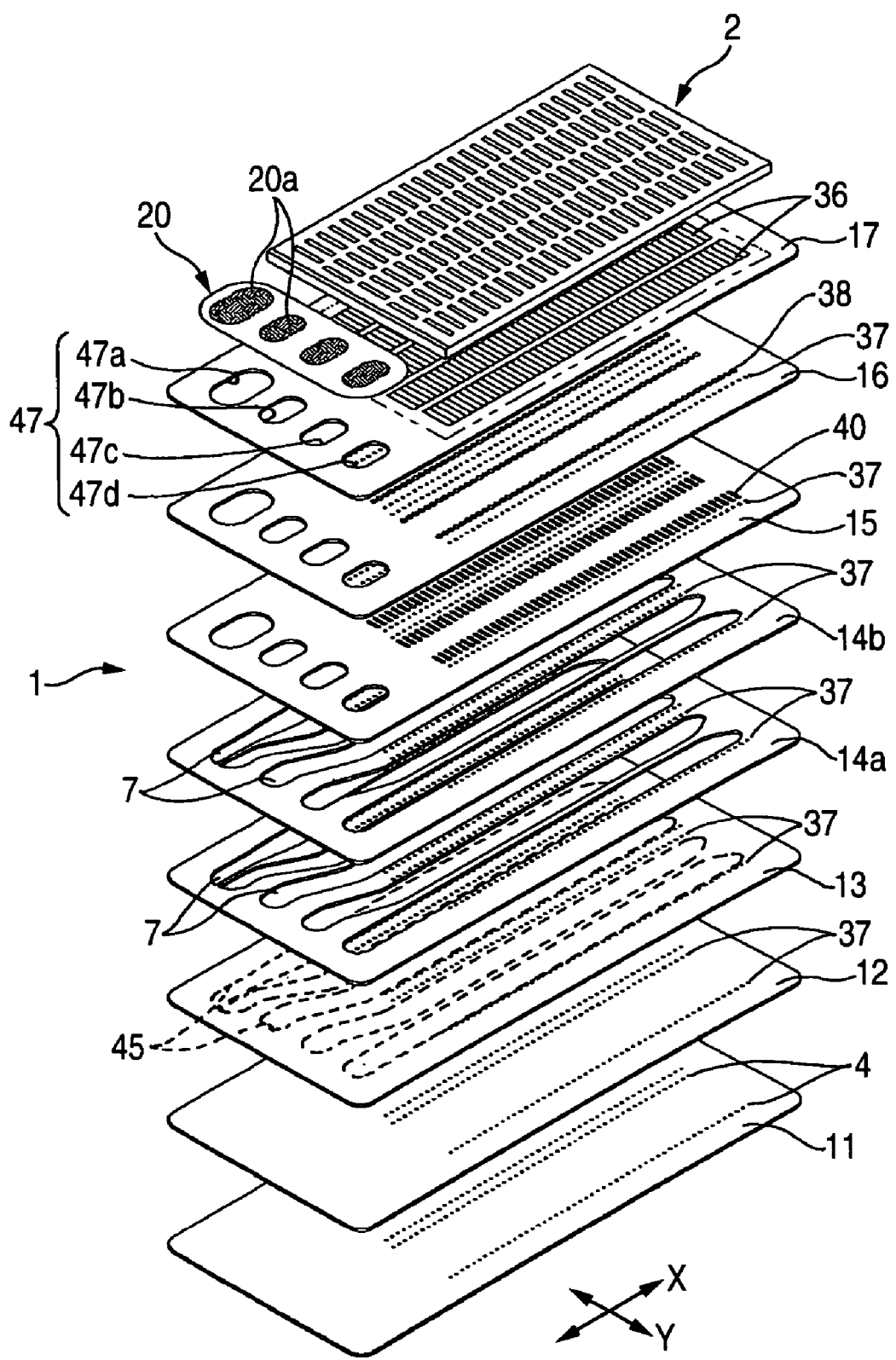
FIG. 2 is an exploded perspective view illustrating an inkjet head.

As shown in FIG. 2, the cavity unit 1 has a laminated structure having a total of eight thin plates, which include a nozzle plate 11, a spacer plate 12, a damper plate 13, two manifold plates 14a and 14b, a supply plate 15, a base plate 16, and a cavity plate 17, are laminated and bonded to each other with an adhesive agent.

In this embodiment, each of the plates 11 to 17 has a thickness of about 50 μm to 150 μm. The nozzle plate 11 is made of a synthetic resin such as polyimide. Each of the other plates 12 to 17 is made of a nickel alloy steel containing 42% of nickel. The nozzle plate 11 defines a plurality of nozzles 4 for ejecting ink, which have extremely small diameter, respectively (about 25 μm in this embodiment). The nozzles 4 are arranged at minute intervals. The nozzles 4 are arranged in zigzags in five parallel rows extending along a longitudinal direction (X direction) of the nozzle plate 11.

Figure 3:
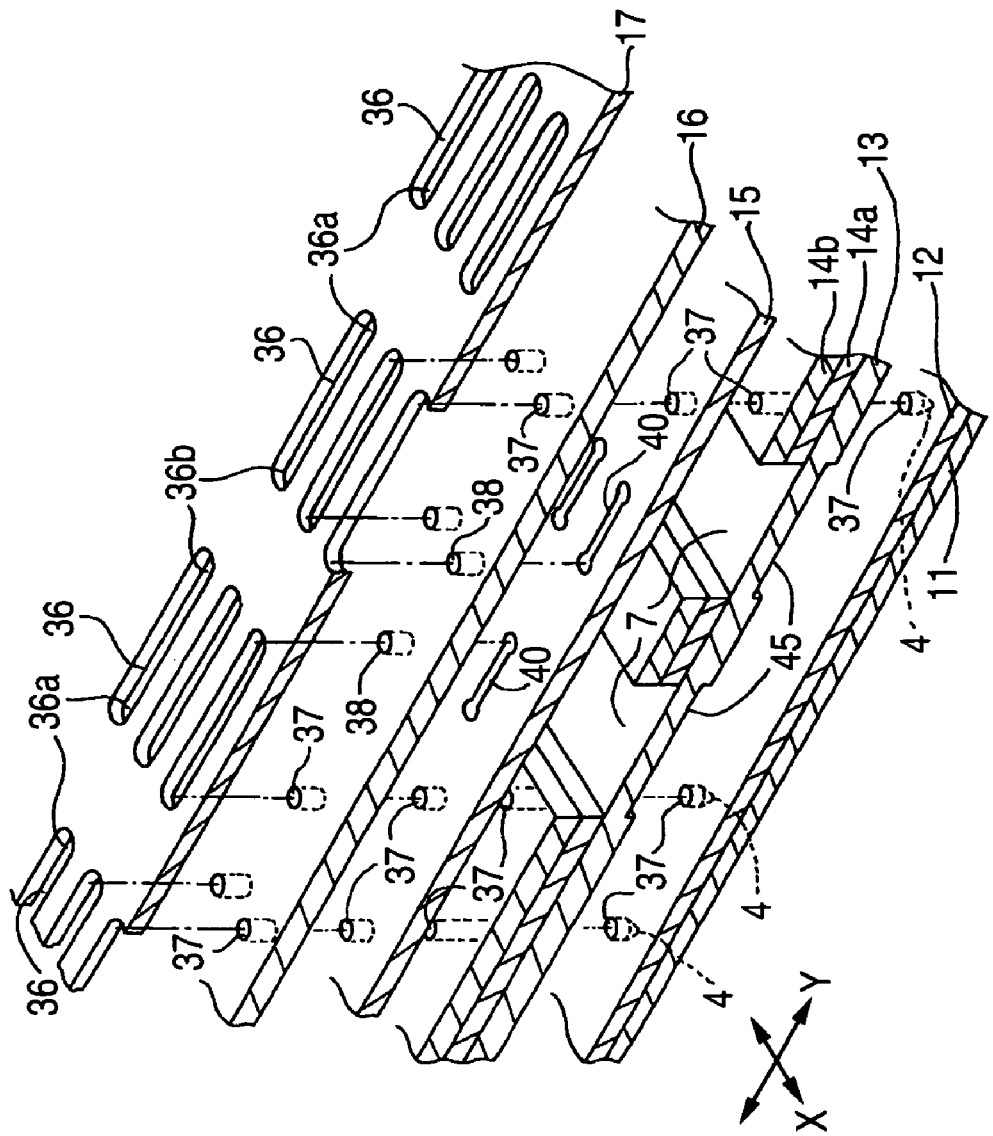
FIG. 3 is an enlarged exploded perspective view illustrating a cavity unit.

Also, as shown in FIG. 3, the cavity plate 17 defines a plurality of pressure chambers 36 arranged in zigzags in five parallel rows extending along a longitudinal direction (X direction) thereof. In this embodiment, each of the pressure chambers 36 has an elongated rectangular shape in a plan view. Each of the pressure chambers 36 are formed to pass through the cavity plate 17 so that the longitudinal direction thereof is parallel to the short-side direction (Y direction) of the cavity plate 17. Also, one longitudinal end portions 36a of the pressure chambers 36 communicate with the nozzles 4, and the other longitudinal end portions 36b thereof communicate with common ink chambers 7, which will be described later.

Each of the one longitudinal end portions 36a of the pressure chambers 36 communicates with the respective nozzles 4 defined in the nozzle plate 11 through communication holes 37, which have extremely small diameter, respectively. The communication holes 37 are formed to pass through the supply plate 15, the base plate 16, the two manifold plates 14a and 14b, the damper plate 13, and the spacer plate 12 in a zigzag manner as with the pressure chambers 36.

The base plate 16 adjacent to a lower surface of the cavity plate 17 defines through-holes 38 connected to the other longitudinal end portions 36b of the respective pressure chambers 36.

The supply plate 15 adjacent to a lower surface of the base plate 16 defines connection flow paths 40 for supplying ink from the common ink chamber 7 to the respective pressure chambers 36, respectively. Each of the connection flow paths 40 has an inlet opening through which the ink is introduced from the common ink chamber 7, an outlet opening opened to the pressure chamber 36 side (the through-holes 38), and a flow restriction portion located between the inlet and outlet openings. The flow restriction portions of the connection flow paths 40 have a small cross sectional area so as to have the largest flow resistance of the ink in the respective connection flow paths 40.

The two manifold plates 14a and 14b have five long common ink chambers 7, which extend along respective rows of the nozzles 4 and pass through the entire thickness thereof, along the longitudinal direction (X direction) thereof. That is, as shown in FIGS. 2 and 4, the two manifold plates 14a, 14b are laminated. The supply plate 15 covers an upper surface (in FIG. 2, a lower surface) of the laminated manifold plates. The damper plate 13 covers a lower surface (in FIG. 2, an upper surface) of the laminated manifold plates. As a result, a total of five common ink chambers (manifold chambers) 7 are defined hermetically. When viewed in plan view from a laminating direction of each plate, each common ink chamber 7 elongates in a direction substantially parallel to the rows of the pressure chambers 36 (the direction of the rows of the nozzles 4) while partially overlapping the pressure chambers 36.

As shown in FIGS. 3 and 4, the damper plate 13 adjacent to the manifold plate 14a defines damper chambers 45, which are recessed in a lower surface of the damper plate 13. The damper chambers 45 are isolated from the common ink chambers 7. As shown in FIG. 2, positions and shapes of respective damper chambers 45 are identical with those of respective common ink chambers 7. Since the damper plate 13 is made of elastically deformable metal, sheet-shaped ceiling portions on an upper side of the damper chambers 45 can freely oscillate toward the common ink chambers 7 and toward the damper chambers 45. That is, even though pressure variation generated in the pressure chamber 36 upon ejecting ink is transmitted to the common ink chamber 7, the pressure variation can be damped or absorbed by an elastic deformation of the ceiling portion of the damper chamber 45, thereby preventing the crosstalk transmitting the pressure variation to other pressure chambers 36.

In addition, as shown in FIG. 2, four ink supply ports 47 are defined to pass through the cavity plate 17, the base plate 16, and the supply plate 15 at the short-side end thereof so that positions of the supply holes 47 correspond to each other in an up and down direction. The four ink supply ports 47 communicate with end portions of the respective common ink chambers 7, so that the ink is supplied to the common ink chambers 7 from an ink supply source through the ink supply ports 47. The four ink supply ports 47 are denoted by 47a, 47b, 47c, and 47d from the left side of FIG. 2, respectively.

In an ink flow path from the ink supply ports 47 to the nozzles 4, after ink is supplied from the ink supply ports 47 to the common ink chambers 7 serving as ink supply channels, the ink is distributed to each of the pressure chambers 36 via the connection flow paths 40 of the supply plate 15 and the through-holes 38 of the base plate 16 as shown in FIG. 3. Then, as described later, by activation of the piezoelectric actuator unit 2, the ink supplied to each of the pressure chambers 36 is delivered to the nozzle 4 corresponding to the pressure chamber 36 via the corresponding communication holes 37.

In this embodiment, as shown in FIG. 2, the four ink supply ports 47 are provided, while the five common ink chambers 7 are provided. Here, only the ink supply port 47a is connected to two common ink chambers 7, 7. Black ink is supplied to the ink supply port 47a. This is because the black ink is more frequently used than other color ink. Yellow, magenta, and cyan ink are supplied to the ink supply ports 47b, 47c, 47d, respectively. The ink supply ports 47a, 47b, 47c and 47d have respective filter elements 20 attached thereon with adhesive agent. The filter elements 20 have filtering portions 20a (see FIG. 1).

During manufacturing process, the cavity unit 1 is manufactured in the following manner. A first subunit 1a including two plates, that is, the nozzle plate 11 and the spacer plate 12, and a second subunit 1b including a six plates in total, that is, the damper plate 13, the manifold plates 14a, 14b, the supply plate 15, the base plate 16, and the cavity plate 17, are manufactured separately. Thereafter, the first and second subunits 1a and 1b are laminated and bonded to each other (see FIG. 4).

The adhesive agent is applied onto laminated surface of the six plates forming the second subunit 1b, that is, onto laminated surfaces of the damper plate 13, the manifold plates 14a and 14b, the supply plate 15, the base plate 16, and the cavity plate 17. Then, the six plates are bonded simultaneously. Therefore, an escape groove 21 for guiding excessive adhesive agent along each laminated surface is defined in each laminated surface thereof (see FIG. 5). Since the escape groove 21 draws the fluid adhesive at a time of bonding with using a capillary phenomenon, the cross sectional area of the escape groove 21 is smaller than those of other openings serving as ink paths defined in each of the plates.

Figure 5A:
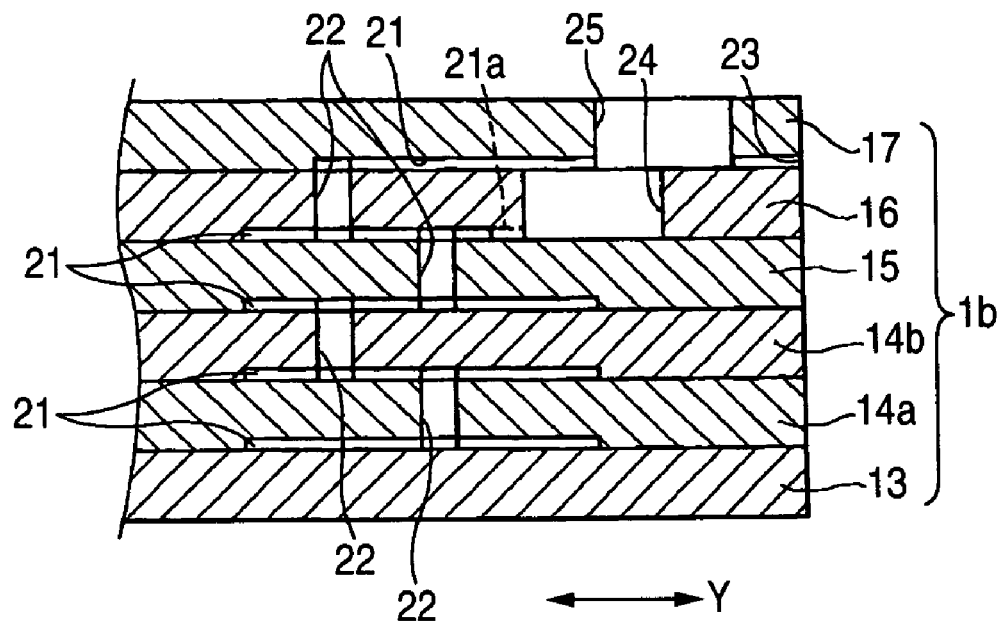
FIG. 5A is a cross-sectional view illustrating a first reservoir portion and a second reservoir portion.
Figure 6:
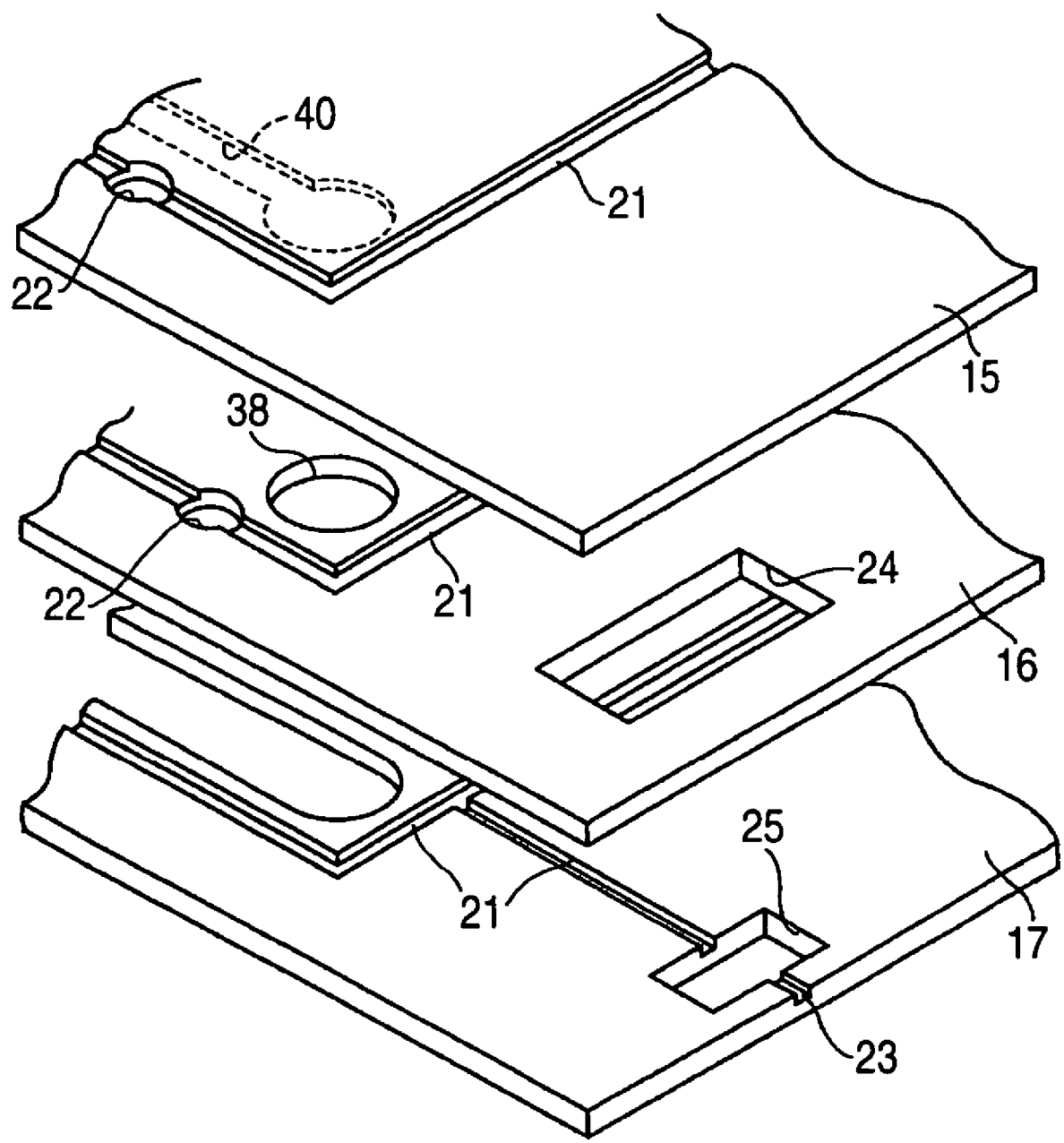
FIG. 6 is an exploded perspective view illustrating first and second reservoir portions when viewed from a lower side.

In this embodiment, as shown in FIGS. 5A and 6, the escape grooves 21 are downwardly opened to lower surfaces (on the nozzle 4 side) of each of five plates other than the damper plate 13 disposed at the lowermost side upon bonding, i.e., the lower surfaces of the manifold plates 14a and 14b, the supply plate 15, the base plate 16, and the cavity plate 17. Also, through-holes 22 for the adhesive agent are defined to pass through the manifold plates 14a, 14b, the supply plate 15, and the base plate 16 in the thickness direction. The escape grooves 21 and 21 provided with sandwiching the plate communicate with each other through the through-hole 22 (see FIG. 5A).

Figure 5B:
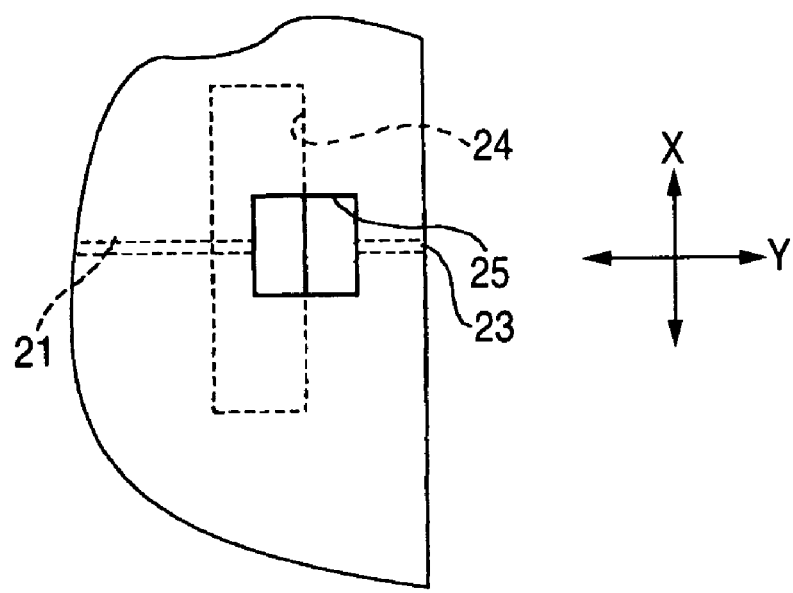
FIG. 5B is a plan view illustrating the second reservoir portion.

The escape groove 21 has outlet portions 23 on an outer peripheral side surface intersecting with the laminated surface. In this embodiment, three outlet portions 23 are provided on one longitudinal (X direction) peripheral side of the cavity plate 17, which is the uppermost plate of the second subunit 1b. That is, total of six outlet portions 23 are provided on both longitudinal peripheral sides of the cavity plate 17 (see FIG. 1). A first reservoir portion 24 and a second reservoir portion 25 capable of accumulating an adhesive agent passing through the escape groove 21 are defined in front of the outlet portion 23 and in an intermediate portion of the escape groove 21. The second reservoir portion 25 is disposed closer to the outlet portion 23 than the first reservoir portion 24 (see FIGS. 5A, 5B, and 6). The escape grooves 21 have a smaller width in its extending direction than those of the first and second reservoir portions 24, 25 as shown in FIG. 5B. The first reservoir portion 24 may have a larger width in the longitudinal direction (X direction) of the cavity plate 17, than that of the second reservoir portion 25 as shown in FIG. 5B. Further, a height (depth) of the escape grooves 21 is smaller than those of the first and second reservoir portions 24, 25 as shown in FIG. 5A.

The second reservoir portion 25 is defined as a through hole passing, to pass through the cavity plate 17 having the escape groove 21 and the outlet portion 23. When viewed from the laminated direction in a plan view, the second reservoir portion 25 has a substantially rectangle shape. On the other hand, the first reservoir portion 24 is defined in the base plate 16, which is disposed beneath the cavity plate 17 upon bonding. Since the supply plate 15 covers a lower surface side of a through hole, which is defined in the base plate 16 and has a substantially rectangle shape when viewed from the laminated direction in plan view, the first reservoir portion 24 is defined to be a recess having a bottom portion. The first and second reservoir portions 24 and 25 overlap partially when viewed in the plan view, to communicate with each other. Therefore, the first and second reservoir portions 24 and 25 are connected to each other in a broad area (see FIGS. 5A and 5B). The first and second reservoir portions 24 and 25 are configured to be capable of accumulating the whole excessive adhesive agent. Therefore, the escape groove 21 defined between the first reservoir portion 25 and the outlet portion 23 serves as an escape groove for air (bubbles), but not as an escape groove for the adhesive agent.

Also, since the second reservoir portion 25 is provided as an auxiliary reservoir portion, the capacity of the second reservoir portion 25 is smaller than that of the first reservoir portion 24. The escape groove may be opened to (communicate with) a lower side of the first reservoir portion 24, like an escape groove 21a shown by dotted lines in FIG. 5A.

Recesses or through holes such as the ink supply ports 47, the common ink chambers 7, the communication holes 37, the through-holes 38, the connection flow paths 40, the damper chambers 45, the escape grooves 21, the through-holes 22, the first reservoir portion 24 and the second reservoir portion 25 in the metallic plates 12 to 17 are formed by, for example, etching, electrical discharge machining, plasma machining, or laser machining. A substantially rectangular sheet-shaped filter element 20, which is made of a synthetic resin such as polyimide, has the filtering portion 20a having small holes formed by laser machining. If the filter element 20 is made of metal, the filtering portion 20a may be formed by electro-forming.

On the other hand, like a piezoelectric actuator unit disclosed in JP-A-Hei.4-341853, the piezoelectric actuator unit 2 according to this embodiment has a structure in which a plurality of piezoelectric sheets are laminated on each other (not shown). Individual electrodes having a narrow width are formed on an upper surface (i.e., surface having a relatively large width) of each even-numbered one of the piezoelectric sheets, which have thickness of about 30 μm, as counted from the lowermost one. The individual electrodes are formed at positions corresponding to the pressure chambers 36 of the cavity unit 1, respectively. The individual electrodes extend in the long-side direction (X direction) to form rows. A common electrode, which is common to the plurality of pressure chambers 36, is formed on an upper surface (i.e., surface having a relatively large width) of each odd-numbered one of the piezoelectric sheets as counted from the lowermost one. On an upper surface of the top sheet, surface electrodes electrically connected to the individual electrodes and a surface electrode electrically connected to the common electrodes are formed as a surface electrode 48.

An adhesive agent sheet (not-shown) made of a synthetic resin material having ink nonpermeability is attached onto the entire lower surface of the piezoelectric actuator unit 2 (i.e., the wide width surface opposed to the pressure chambers 36) in advance. Then, the actuator unit 2 is bonded and fixed to the cavity unit 1 so that the individual electrodes are located at positions corresponding to the pressure chambers 36 of the cavity unit 1. Further, the flexible flat cable 3 (see FIG. 4) is laid and pressed onto the upper surface of the actuator unit 2. Thereby, electrically conductive wire patterns (not shown) of the flexible flat cable 3 are electrically connected to the surface electrodes 48, respectively.

In the first embodiment configured as described above, an adhesive agent is applied onto the laminated surfaces of each plates during the manufacture of the second subunit 2b. The six plates laminated on each other are placed on a bonding device (jig) so that the damper plate 13 becomes the lowermost plate. Then, the six plates are pressed while the bonding device sandwiches the six plates from the upper and lower directions. An excessive adhesive agent and air existing in the adhesive agent and the surfaces of the plates flow into the escape grooves 21 of respective surfaces. Since the outlet portion 23 communicating with the outside is formed in the uppermost cavity plate 17, the adhesive agent and air having flown into the escape grooves 21 move upward via the through-hole 22. Further, the escape groove 21 communicates with the first reservoir portion 21, which is provided just below the escape groove 21, in front of the outlet portion 23. Therefore, the excessive adhesive agent drops down due to its weight from the escape groove 21 to the first reservoir portion 24, easily. At this time, since the escape groove 21 of the cavity plate 17 extends to a position overlapping the first reservoir portion 24 of the base plate 16, the excessive adhesive agent can be accumulated reliably in the first reservoir portion 24 without reaching a side surface of the second reservoir portion 25. Further, when the adhesive agent overflows from the first reservoir portion 24, the adhesive agent is accumulated in the second reservoir portion 25 connected to an upper portion of the first reservoir portion 24. Therefore, the adhesive agent will not thus be stuck out from the outlet portion 23 to the outside. When the bonding device sandwiches the plates, the bonding device blocks the upper surface of the second reservoir portion 25. However, the air having flown into the first reservoir portion 24 together with the adhesive agent is exhausted via the outlet portion 23.

In this way, since the adhesive agent guided to the outlet portion 23 via the escape grooves 21 and the through holes 22 is accumulated in the recessed first and second reservoir portions 24 and 25 provided in front of the outlet portion 23, it is possible to prevent the bonding device from being contaminated by the adhesive agent dropped from the outlet portion 23. As a result, cleaning of the bonding device can be reduced, thereby increasing production efficiency.

Figure 7A:
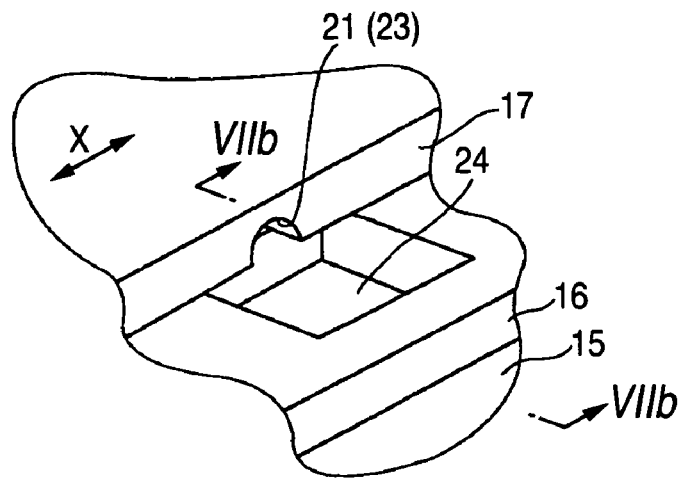
FIG. 7A is a partial perspective view illustrating an inkjet head according to the second embodiment of the invention.
Figure 7B:
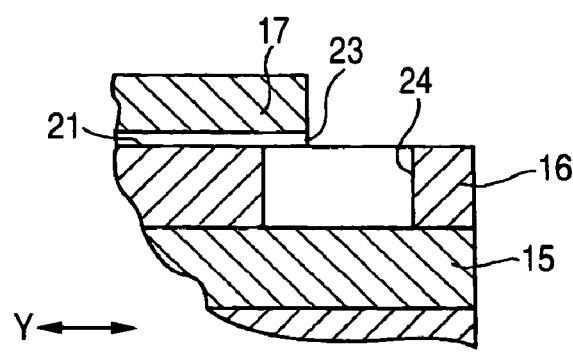
FIG. 7B is a cross sectional view taken along the line VIIb-VIIb shown in FIG. 7A.
Figure 7C:
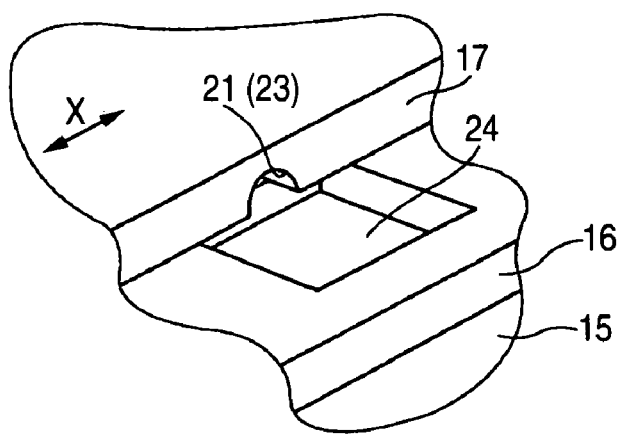
FIG. 7C is a partial perspective view illustrating a modification of the second embodiment.

Next, a second embodiment of the invention will be described with reference to the drawings. FIG. 7A is a partial perspective view illustrating an inkjet head according to the second embodiment. FIG. 7B is a cross sectional view taken along the line VIIb-VIIb shown in FIG. 7A. FIG. 7C is a partial perspective view illustrating a modification of the second embodiment. The same components as those of the first embodiment are denoted by the same reference numerals and a detailed description thereof will thus be omitted herein.

While the escape groove 21 communicates with the first and second reservoir portions 24 and 25 in the first embodiment, only the first reservoir portion 24 is provided in the second embodiment. The first reservoir portion 24 communicates with the outlet portion 23 of the escape groove 21.

As shown in FIGS. 7A and 7B, the first reservoir portion 24 is defined to pass through the base plate 16 to have a substantially rectangle shape when viewed in a plan view. Further, since the supply plate 15 covers the lower surface of the base plate 16, the first reservoir portion 24 is formed to be a recess, which has an opening toward the cavity plate 17 and is surrounded its circumference by wall portions.

Meanwhile, the escape groove 21 and the outlet portion 23 are defined in the lower surface of the cavity plate 17. The cavity plate 17 has smaller width in the Y direction than the base plate 16 so that a terminal edge of the outlet portion 23 is located inside an opening area of the first reservoir portion 24. Accordingly, since the adhesive agent stuck out from the outlet portion 23 is immediately received in the first reservoir portion 24, it is possible to prevent the excessive adhesive agent from being flown on the outer peripheral side surface of the second subunit 1b. Also, since the first reservoir portion 24 is surrounded by the wall portions, it is possible to prevent the excessive adhesive agent from being flown out of the first reservoir portion 24.

Further, FIGS. 7A and 7B show that the first reservoir portion 24 is formed to pass through the base plate 16. However, as shown in FIG. 7C, the first reservoir portion 24 may be recessed in the base plate 16 so that the depth of the first reservoir portion 24 is smaller than thickness of the base plate 16.

Figure 8A:
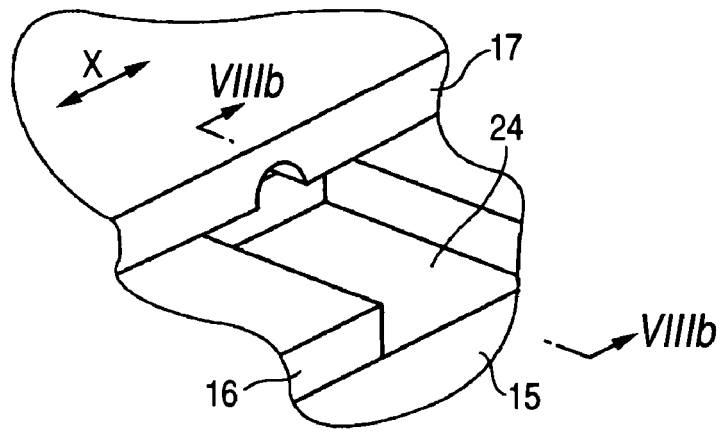
FIG. 8A is a partial perspective view illustrating an inkjet head according to the third embodiment of the invention.
Figure 8B:
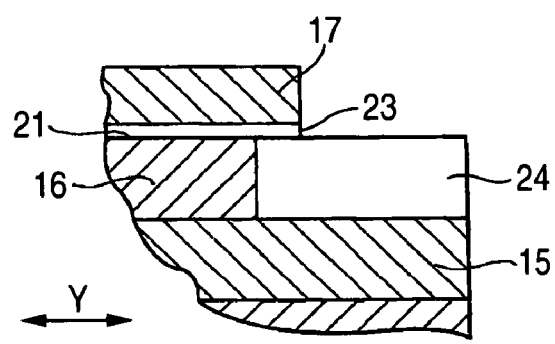
FIG. 8B is a cross sectional view taken along the line VIIIb-VIIIb shown in FIG. 8A.
Figure 8C:
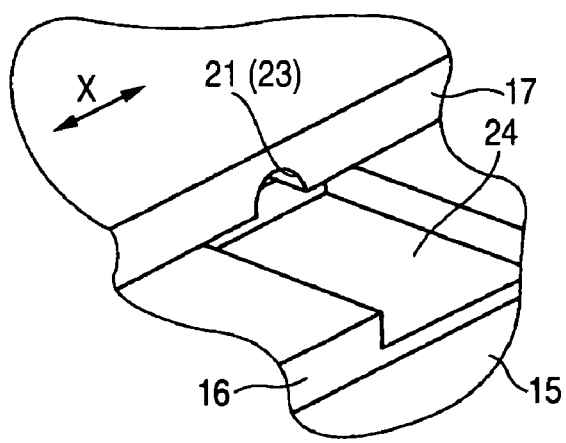
FIG. 8C is a partial perspective view illustrating a modification of the third embodiment.

Next, a third embodiment of the invention will be described with reference to the drawings. FIG. 8A is a partial perspective view illustrating an inkjet head according to the third embodiment of the invention. FIG. 8B is a cross sectional view taken along the line VIIIb-VIIIb shown in FIG. 8A. FIG. 8C is a partial perspective view illustrating a modification of the third embodiment. The same components as those of the first embodiment are denoted by the same reference numerals and a detailed description thereof will thus be omitted herein.

The third embodiment is an application of the second embodiment. Like the second embodiment, only the first reservoir portion 24 is provided in the third embodiment and the outlet portion 23 of the escape groove 21 is provided in an opening area of the first reservoir portion 24. In the third embodiment, as shown in FIGS. 8A and 8B, the first reservoir portion 24 is recessed by providing a notched portion by cutting inwardly the outer peripheral side surface of the base plate 16. The supply plate 15 covers the lower surface of the base plate 16. As a result, the first reservoir portion 24 is formed to be a recess opening toward the cavity plate 17 and the outer peripheral side surface side.

Accordingly, since the adhesive agent stuck out from the outlet portion 23 is immediately received in the first reservoir portion 24, it is possible to prevent the excessive adhesive agent from being flown in the outer peripheral side surface of the second subunit 1b, like the first embodiment.

The cavity unit 1 is an extremely small part. While it is difficult to ensure a wide space for the first reservoir portion 24 in the vicinity of the outer peripheral side surface of the base plate 16, the first reservoir portion 24 according to the third embodiment can have a wide opening area since the first reservoir portion 24 does not have a wall portion on the outer peripheral side surface side. As a result, it is possible to increase the amount of adhesive agent, which can be accumulated in the first reservoir portion 24. Further, in the third embodiment, as shown in FIG. 8C, the first reservoir portion 24 may be recessed on the base plate 16 so that the depth of the first reservoir portion 24 is smaller than thickness of the base plate 16.

Figure 9A:
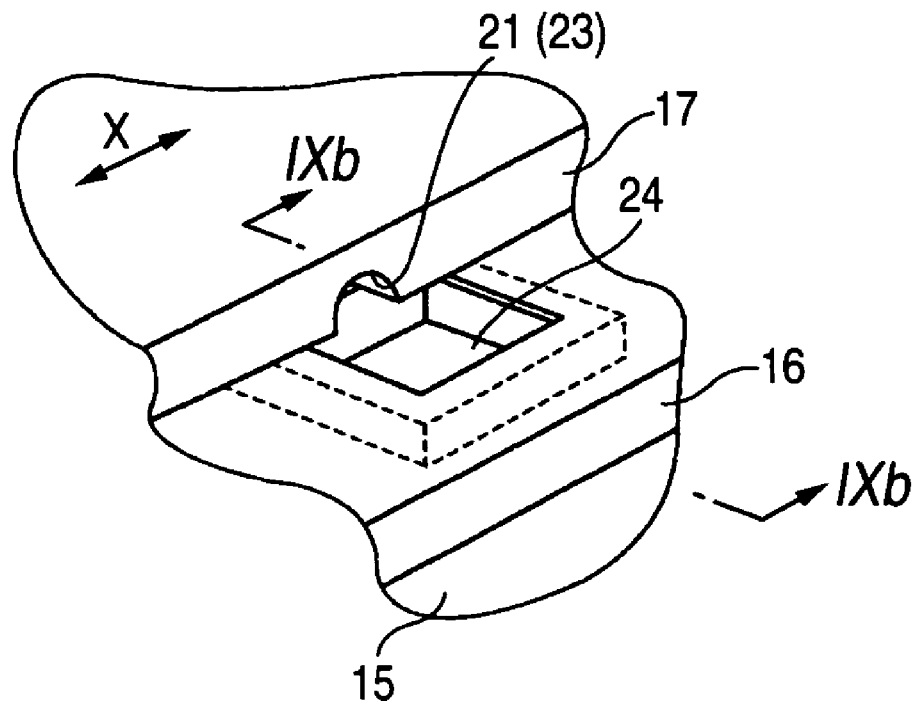
FIG. 9A is a partial perspective view illustrating the fourth embodiment of the invention.
Figure 9B:
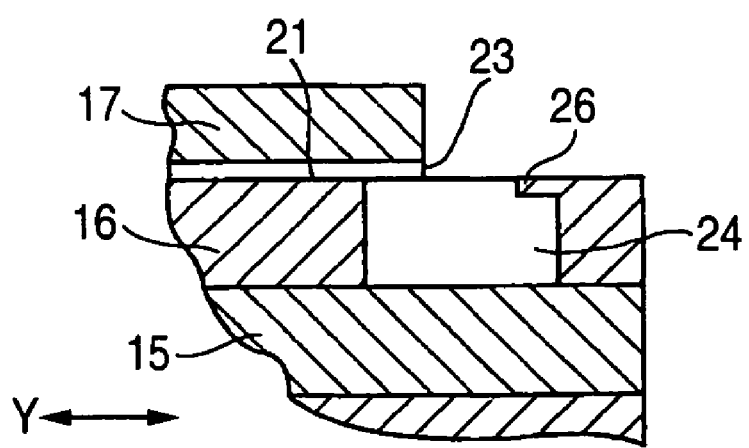
FIG. 9B is a cross sectional view taken along the line IXb-IXb shown in FIG. 9A.

Next, a fourth embodiment of the invention will now be described with reference to the drawings. FIG. 9a is a partial perspective view illustrating the fourth embodiment of the invention. FIG. 9B is a cross sectional view taken along the line IXb-IXb shown in FIG. 9A. The same components as those of the first embodiment are denoted by the same reference numerals and a detailed description thereof will thus be omitted herein.

The fourth embodiment is another application of the second embodiment. Like the second embodiment, only the first reservoir portion 24 is provided in the fourth embodiment, and the outlet portion 23 of the escape groove 21 is provided in an opening area of the first reservoir portion 24. Also, the first reservoir portion 24 is surrounded its circumference by wall portions. On an upper side of the wall portions, an overhanging portion 26 is provided to cover the opening on the cavity plate 17 side.

Accordingly, since the adhesive agent stuck out from the outlet portion 23 is immediately received in the first reservoir portion 24, it is possible to prevent the excessive adhesive agent from being flown on the outer peripheral side surface of the second subunit 1b, like the first embodiment. Further, the overhanging portion 26 can prevent the adhesive agent from being overflown from the first reservoir portion 24.

Figure 10A:
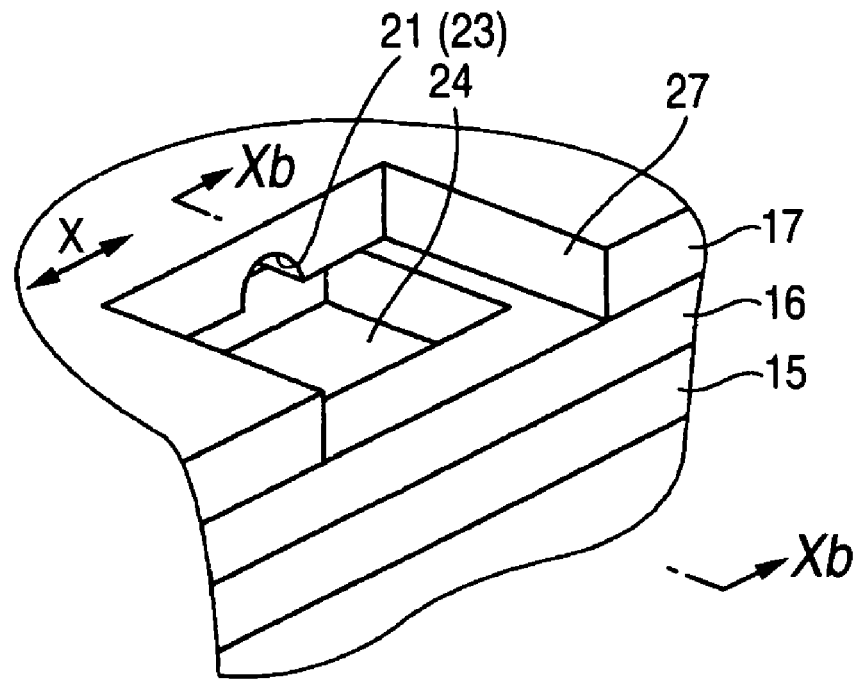
FIG. 10A is a partial perspective view illustrating the fifth embodiment of the invention.
Figure 10B:
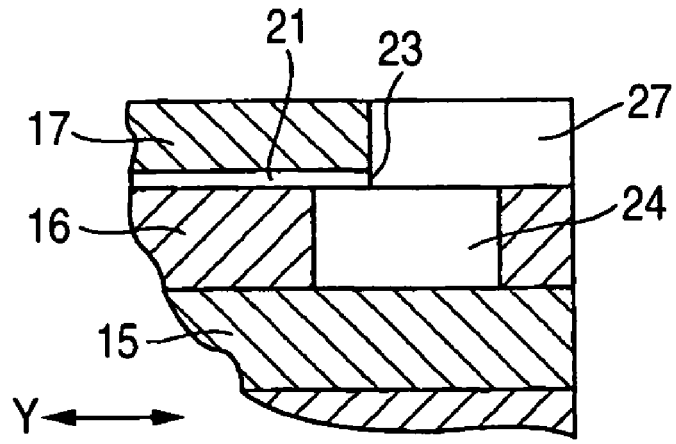
FIG. 10B is a cross sectional view taken along the line Xb-Xb shown in FIG. 10A.

Next, a fifth embodiment of the invention will now be described with reference to the drawings. FIG. 10A is a partial perspective view illustrating the fifth embodiment of the invention. FIG. 10B is a cross sectional view taken along the line Xb-Xb shown in FIG. 10A. The same components as those of the first embodiment are denoted by the same reference numerals and a detailed description thereof will thus be omitted herein.

The fifth embodiment is another application of the second embodiment. Like the second embodiment, only the first reservoir portion 24 is provided in the fifth embodiment, and the outlet portion 23 of the escape groove 21 is provided in an opening area of the first reservoir portion 24. Also, in the fifth embodiment, the outlet portion 23 of the escape groove 21 is provided in the notched portion 27 by cutting the cavity plate 17 inwardly from the outer peripheral side surface, unlike the second embodiment. Accordingly, since the adhesive agent stuck out from the outlet portion 23 is immediately received in the first reservoir portion 24, it is possible to prevent the excessive adhesive agent from being flown on the outer peripheral side surface of the second subunit 1b, like the first embodiment. Further, the cavity plate 17 may be formed to have the same width in the X direction as other plates such as the base plate 16.

In the above-mentioned first to fifth embodiments, the outlet portion 23 of the escape groove 21 is provided in the cavity plate 17. However, the outlet portion 23 of the escape groove 21 may be provided in another plate. Also, the escape groove 21 may be provided on an upper surface of each plate. Also, in the above description, the cavity plate 17 is the uppermost plate upon bonding. However, the first reservoir portion 24, the second reservoir portion 25 and the outlet portion 23 may be adequately located with respect to the escape groove 21, depending on the bonding conditions.

Figure 11:
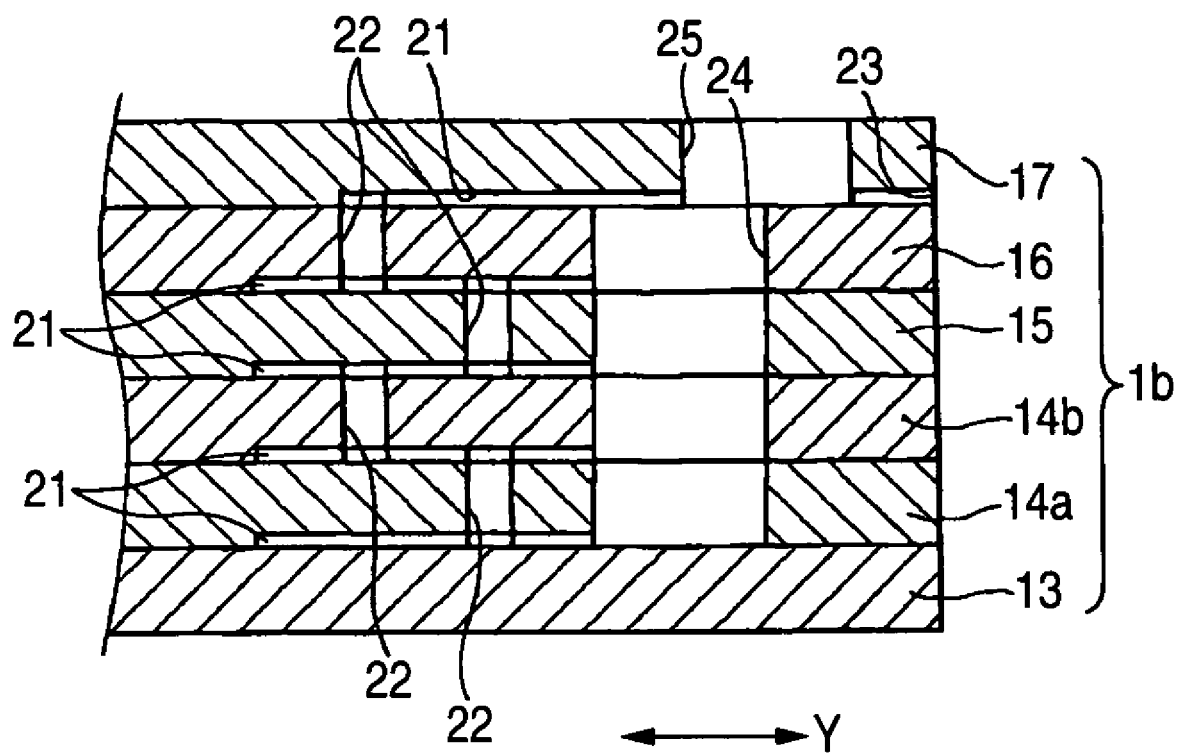
FIG. 11 is a cross-sectional view illustrating a second subunit 1b according to a modified embodiment of the invention.

In the first to fifth embodiments, the first reservoir portion 24 passes through only the base plate 16. However, the invention is not limited thereto. The first reservoir portion 24 may pass through the manifold plates 14a, 14b, the supply plate 15 and the base plate 16 as shown in FIG. 11, thereby increasing the capacity of the first reservoir portion 24. In this case, the escape groove 21 of each plate may be communicate with the first reservoir portion 24 as shown in FIG. 11. It is apparent from FIG. 11 that the first reservoir portion 24 can serve as a through hole for air when bonding the plates. Therefore, the through holes 22 may be omitted.

Further, while the above-mentioned embodiments have been applied to the inkjet head, the invention may be applied to a laminated structure including a plurality of sheet-shaped elements, such as a lead frame made of a metallic plate, which has patterns on at least one surface thereof and are laminated on each other by adhesive upon assembling an electronic element.

What is claimed is:

1. A laminated and bonded structure comprising:
a plurality of plate including a first plate and a second plates, the plates laminated and bonded to each other with an adhesive agent, the first and second plates having laminated surfaces bonded to each other, wherein: a first escape groove is defined in the laminated surface of at least one of the first and second plates, the first escape groove guiding the adhesive agent along the laminated surface of the at least one of the first and second plates, the first escape groove including an outlet portion in an outer peripheral side surface of the at least one of the first and second plates, the outer peripheral side surface intersecting with the laminated surfaces; and one of the first and second plates defines a recessed first reservoir portion accumulating the adhesive agent passing through the first escape groove, the first reservoir portion communicating with the first escape groove.

2. The laminated and bonded structure according to claim 1, wherein a predetermined pattern formed on at least one surface of the first plate.

3. The laminated and bonded structure according to claim 2, wherein:
the predetermined pattern formed on the first plate includes an opening forming a plurality of flow paths used to eject ink; and
the laminated and bonded structure forms at least a part of an inkjet head.

4. The laminated and bonded structure according to claim 1, wherein the first reservoir portion communicates with one of the outlet portion and an intermediate portion of the first escape groove.

5. The laminated and bonded structure according to claim 1, wherein:
the first plate defines the first escape groove in the laminated surface thereof;
the second plate defines a second escape groove in another surface, the second escape groove guiding the adhesive agent along the other surface of the second plate;
the second plate further defines a through hole passing through the second plate in a thickness direction; and
both ends of the through hole communicate with the first escape groove and the second escape groove, respectively.

6. The laminated and bonded structure according to claim 5, wherein the second escape groove communicates with the first reservoir portion.

7. The laminated and bonded structure according to claim 1, wherein:
the plates include a third plate;
the second plate defines the first escape groove in the laminated surface thereof;
the third plate defines a second escape groove in one surface thereof bonded to another surface of the second plate, the second escape groove guiding the adhesive agent along the one surface of the third plate;
the second plate further defines a through hole passing through the second plate in a thickness direction; and
both ends of the through hole communicate with the first escape groove and the second escape groove, respectively.

8. The laminated and bonded structure according to claim 7, wherein the second escape groove communicates with the first reservoir portion.

9. The laminated and bonded structure according to claim 1, wherein the first reservoir portion has a width in a direction intersecting with an extending direction of the first escape groove, the width of the first reservoir portion being larger than that of the first escape groove.

10. The laminated and bonded structure according to claim 1, wherein the first reservoir portion has a height higher than that of the first escape groove.

11. The laminated and bonded structure according to claim 1, wherein:
the first plate is an outermost plate of the plurality of plates;

the first plate defines the first reservoir portion; and the first reservoir portion has opening in another surface of the first plate.

12. The laminated and bonded structure according to claim 1, wherein:

the second plate defines the first reservoir portion; and at least a part of the first reservoir portion is located at a lower position than the first escape groove.

13. The laminated and bonded structure according to claim 12, wherein:

the first plate defines a recessed second reservoir portion being closer to the outlet portion of the first escape groove than the first reservoir portion, the second reservoir portion communicating with the first reservoir portion;

at least a part of the second reservoir portion is located at a higher position than the first reservoir portion; and when viewed in a plan view, the second reservoir portion overlaps the first reservoir portion at least partially.

14. The laminated and bonded structure according to claim 13, wherein:

the first plate is an outermost plate of the plurality of plates; and the first plate defines an opening in another surface thereof, the opening communicating with the second reservoir portion.

15. The laminated and bonded structure according to claim 13, wherein the first reservoir portion has a width in a direction intersecting with an extending direction of the first escape groove, the width of the first reservoir being larger than that of the second reservoir portion.

16. The laminated and bonded structure according to claim 12, wherein:

the first plate defines the first escape groove in the laminated surface thereof;

the first reservoir portion of the second plate communicates with the outlet portion of the first escape groove; and a terminal edge of the outlet portion of the first escape groove is inside an opening area of the first reservoir portion.

17. The laminated and bonded structure according to claim 16, wherein the first reservoir portion of the second plate is defined in a recessed manner so as to be surrounded by wall portions.

18. The laminated and bonded structure according to claim 17, wherein overhanging portions protrude from the wall portions to cover an opening of the first reservoir portion partly.

19. The laminated and bonded structure according to claim 16, wherein the first reservoir portion of the second plate defines an opening in the outer peripheral side surface of the second plate.

* * * * *